United States Patent
Hwang et al.

(10) Patent No.: US 9,449,294 B2
(45) Date of Patent: Sep. 20, 2016

(54) METHOD AND APPARATUS FOR MANAGING USER DEVICES AND CONTENTS BY USING QUICK RESPONSE CODES

(75) Inventors: Yong-ho Hwang, Seoul (KR);
Choong-hoon Lee, Seoul (KR);
Sang-su Choi, Hwaseong-si (KR);
Jin-mok Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/240,315

(22) Filed: Sep. 22, 2011

(65) Prior Publication Data

US 2012/0199647 A1    Aug. 9, 2012

(30) Foreign Application Priority Data

Feb. 7, 2011    (KR) .................. 10-2011-0010771

(51) Int. Cl.
*G06K 19/06*    (2006.01)
*G06Q 10/08*    (2012.01)

(52) U.S. Cl.
CPC .................. *G06Q 10/087* (2013.01)

(58) Field of Classification Search
USPC ....................................................... 235/375
See application file for complete search history.

(56) References Cited

U.S. PATENT DOCUMENTS

| | | | |
|---|---|---|---|
| 6,418,441 B1* | 7/2002 | Call | 705/23 |
| 2007/0063050 A1* | 3/2007 | Attia et al. | 235/462.46 |
| 2007/0136202 A1* | 6/2007 | Noma et al. | 705/51 |
| 2009/0083808 A1* | 3/2009 | Morrison | 725/87 |
| 2011/0058516 A1* | 3/2011 | Small et al. | 370/328 |
| 2011/0210171 A1* | 9/2011 | Brown et al. | 235/382 |
| 2012/0130851 A1* | 5/2012 | Minnick et al. | 705/26.8 |
| 2012/0153015 A1* | 6/2012 | Gomez et al. | 235/375 |

FOREIGN PATENT DOCUMENTS

| | | | |
|---|---|---|---|
| JP | 2006119814 A | | 5/2006 |
| KR | 1020090114075 A | | 11/2009 |

OTHER PUBLICATIONS

Communication dated Jul. 27, 2016, issued by the Korean Intellectual Property Office in counterpart Korean Application No. 10-2011-0010771.

* cited by examiner

*Primary Examiner* — Allyson Trail
(74) *Attorney, Agent, or Firm* — Sughrue Mion, PLLC (57) ABSTRACT

A method and apparatus for managing user devices and contents with quick response (QR) codes. An image of a QR code displayed on a user terminal is captured; the captured image of the QR code is analyzed, and a domain registration request message is generated based on the QR code; and the domain registration request message is transmitted to a domain server, and a domain registration response message is received from the domain server.

27 Claims, 9 Drawing Sheets

METHOD AND APPARATUS FOR MANAGING USER DEVICES AND CONTENTS BY USING QUICK RESPONSE CODES

CROSS-REFERENCE TO RELATED PATENT APPLICATION

This application claims priority from Korean Patent Application No. 10-2011-0010771, filed on Feb. 7, 2011, in the Korean Intellectual Property Office, the disclosure of which is incorporated herein in its entirety by reference.

BACKGROUND

1. Field

Apparatuses and methods consistent with exemplary embodiments relate to a method and apparatus for managing user devices and contents, and more particularly, to a method and apparatus for managing user devices and contents by using quick response (QR) codes.

2. Related Art

Related art systems for managing user devices individually perform domain registration process on individual devices.

In this case, a user may manually perform predetermined domain registration on each of individual devices together with a domain server.

When content is shared between devices, content of other devices may be manually searched to use the contents of the other devices.

SUMMARY

An aspect of the exemplary embodiments provides a method and apparatus for managing user devices and contents by using QR codes to be automatically registered to a domain, to share contents between devices, or to re-download contents from a server.

According to an exemplary embodiment, a method of managing user devices includes capturing an image of a quick response (QR) code displayed on a user terminal; analyzing the captured image of the QR code and generating a domain registration request message based on the QR code; and transmitting the domain registration request message to a domain server and receiving a domain registration response message from the domain server.

The user terminal may be a device registered to a domain.

The displayed QR code may be received from the domain server or is generated by the user terminal itself.

The QR code may include domain information and information required to be registered to a domain.

The QR code may include at least one of domain server information, a user identification (ID), digital rights management (DRM) information, log-in information, and server verification information.

If an application related to the QR code requires authentication (e.g., a log-in process), the user terminal may display the QR code after performing the log-in process.

According to another exemplary embodiment, a method of managing contents includes capturing an image of a quick response (QR) code of a content, which is displayed on a user terminal; analyzing the captured image of the QR code and checking domain information and content information; and performing a domain registration process together with a domain server based on the checked domain information, and obtaining the content from the user terminal or a content server based on the content information.

The displayed QR code may be received from the content server or is generated by the user terminal itself.

The exemplary method may include displaying a list of content on the user terminal; and adding the QR code onto the content.

The QR code may include domain information, information required to be registered to a domain, and content information.

The QR code may include at least one of domain information, content information, content server information, digital rights management (DRM) information, and user information.

Whether another user terminal is registered to a domain may be determined based on the domain information included in the QR code.

The exemplary method may further include requesting the user terminal or the content server to transmit content if another user terminal is registered to the same domain as the user terminal; and transmitting a domain registration request to the domain server if the other user terminal is not registered to the same domain as the user terminal.

The exemplary method may further include obtaining a license of the obtained content from the content server if the content is protected by using a DRM method.

Another exemplary embodiment, provides an apparatus for managing user devices and contents, the apparatus including a quick response (QR) application unit for executing an application related to a QR code; an image capturing unit for capturing the QR code displayed on a user terminal; a QR code decoder for decoding the image of the QR code, which is captured by the image capturing unit, and extracting domain information and content information; and a data transception unit for transmitting a domain registration request message based on the domain information and the content information extracted by the QR code decoder, and receiving a domain registration message or contents from a server.

The user terminal may include a QR code generation unit for generating a QR code based on the domain information and the content information; and a display unit for displaying the QR code generated by the QR code generation unit.

The QR code may include domain information, information required to be registered to a domain, and content information.

BRIEF DESCRIPTION OF THE DRAWINGS

The above and/or other aspects will be more apparent from the following description of the exemplary embodiments, taken in conjunction with the attached drawings, in which.

DETAILED DESCRIPTION

Hereinafter, exemplary embodiments will be described in detail with reference to the attached drawings.

A quick response (QR) code is a two-dimensional (matrix-type) code including various types of information in a pattern (e.g., rectangular lattice).

While a one-dimensional barcode is configured to store only an approximately 20-digit number, a QR code may store up to a 7,089-digit number, a 4,296-digit American Standard Code for Information Interchange (ASCII), 2,953 binary (8-bit) bytes, or 1,817-digit Chinese characters, and has a higher recognition speed, a higher recognition rate, and a better restoration rate than general barcodes. Barcodes may be used to calculate prices, to manage stocks, or to check the number of products. QR codes are mainly used for marketing campaigns, promotions, or public relations.

Furthermore, although only product sellers can have barcode readers and thus customers cannot obtain information by using barcodes, QR codes allow users to directly obtain product information by using QR input devices (e.g., mobile communication devices such as smart phones). For example, but not by way of limitation, smart phone users may download free applications for scanning QR codes, and may scan QR codes on billboards, public relations brochures, posters, magazines, Internet sites, etc. by using their smart phones, thereby obtaining various types of information.

Figure 1:
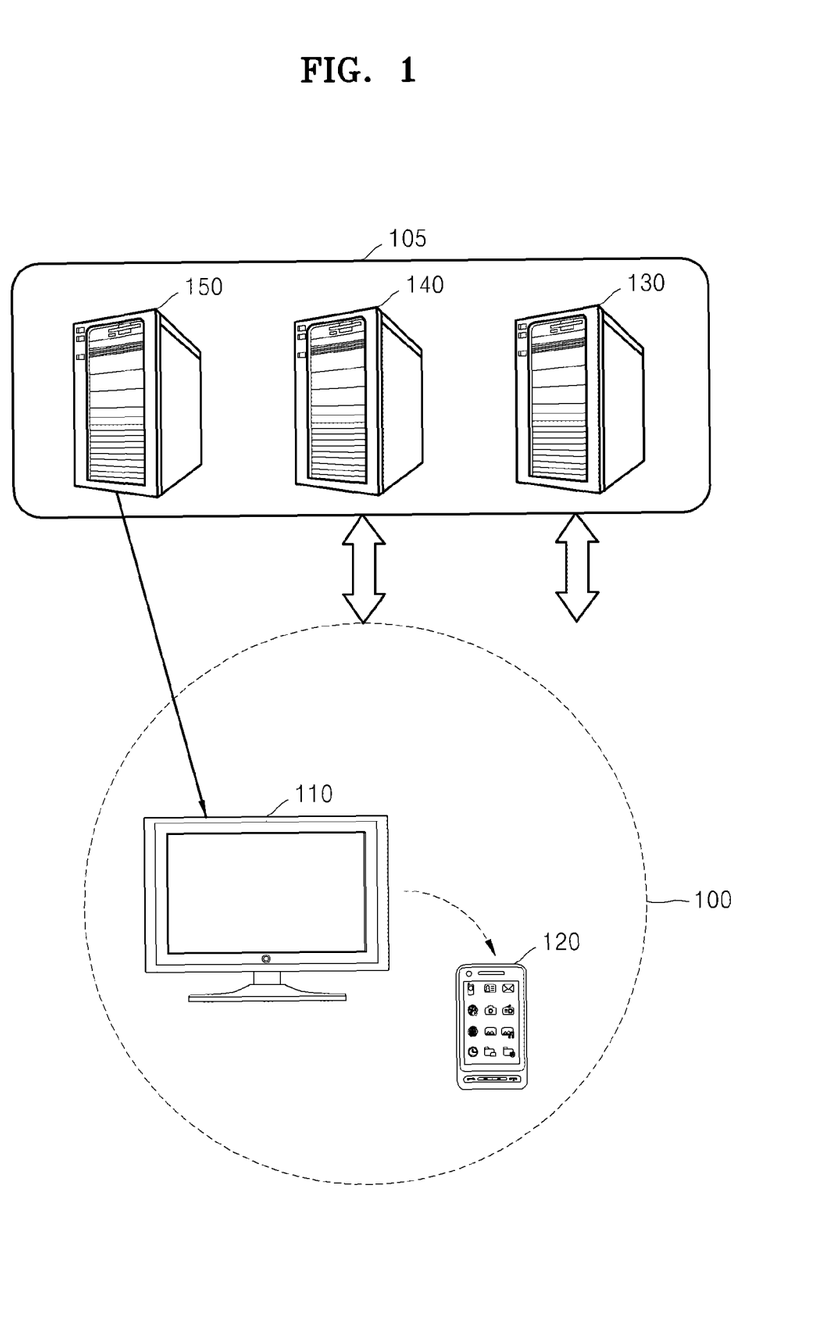
FIG. 1 is a schematic diagram of a network system for managing user devices and contents, according to an exemplary embodiment.

FIG. 1 is a schematic diagram of a network system for managing user devices and contents, according to an exemplary embodiment. The network system includes domain devices 100 and a user device and content management server 105. The domain devices 100 may include a first terminal 110 and a second terminal 120, and the user device and content management server 105 may include a domain server 130, a license server 140, and a content server 150. For example, the first terminal 110 is a user terminal such as a television (TV), and the second terminal 120 is a user terminal such as a mobile telecommunication device (e.g., smart phone). In this case, the second terminal 120 includes a camera function.

The first terminal 110 receives content from the content server 150, or self-generates the content, and displays a QR code self-generated or generated by the domain server 130 or the content server 150. The QR code includes at least one of domain server information, content information, content server information, a user identification (ID), digital rights management (DRM) information, log-in information, and server verification information.

The second terminal 120 performs a domain registration process together with the domain server 130 by using the QR code displayed on the first terminal 110.

The second terminal 120 shares content of the first terminal 110 with the content server 150 or the first terminal 110 by using a QR code included in the content.

Figure 2:
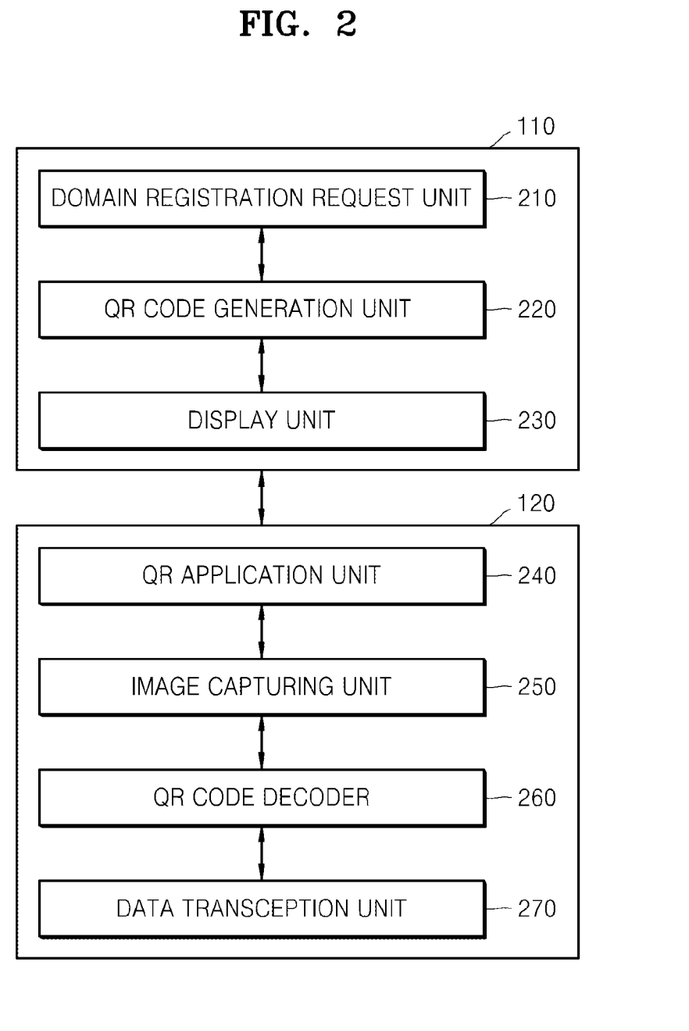
FIG. 2 is a detailed block diagram of a first terminal and a second terminal illustrated in FIG. 1, according to an exemplary embodiment.

FIG. 2 is a detailed block diagram of the first terminal 110 and the second terminal 120 illustrated in FIG. 1, according to an exemplary embodiment.

The first terminal 110 includes a domain registration request unit 210, a QR code generation unit 220, and a display unit 230.

The domain registration request unit 210 transmits a domain registration request to the domain server 130.

The QR code generation unit 220 generates a QR code based on domain information and content information. In this case, the QR code is generated by the first terminal 110, or is received from the domain server 130 or the content server 150.

The display unit 230 displays the QR code generated by the QR code generation unit 220 based on the domain information and the content information.

Meanwhile, the second terminal 120 includes a QR application unit 240, an image capturing unit 250, a QR code decoder 260, a data transception unit 270.

The QR application unit 240 executes a pre-stored QR application.

The image capturing unit 250 captures an image of the QR code displayed on the display unit 230 of the first terminal 110.

The QR code decoder 260 decodes the QR code of the image captured by the image capturing unit 250 and extracts the domain information and the content information.

The data transception unit 270 transmits a message based on the domain information and the content information, and receives a domain registration message or content from the domain server 130, the license server 140, or the content server 150.

Figure 3A:
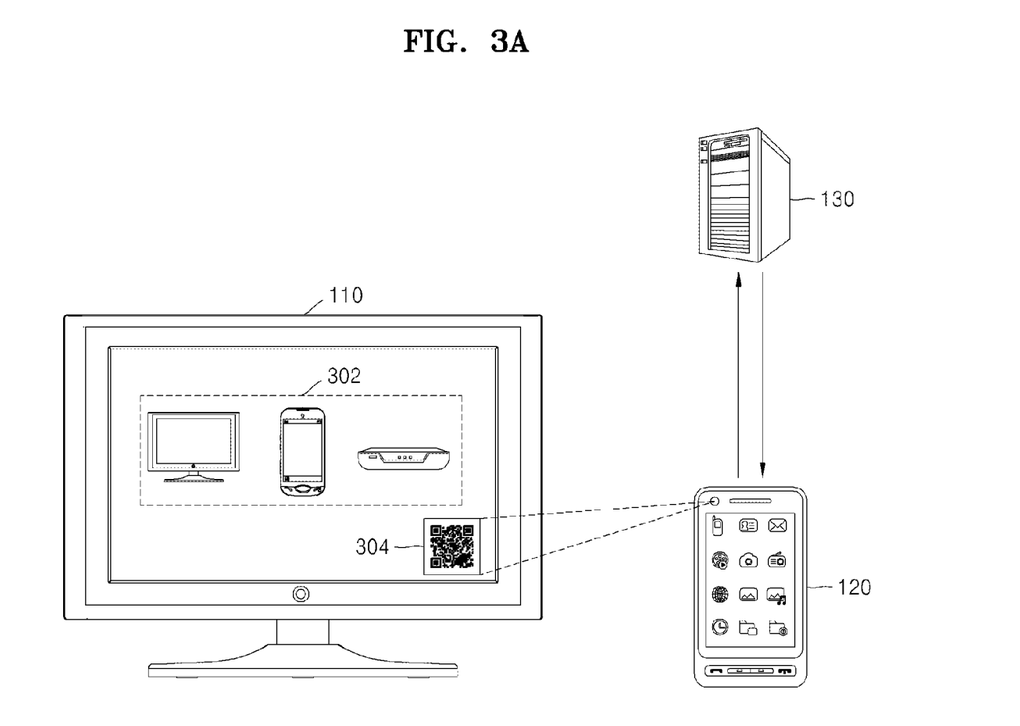
FIG. 3A is a schematic diagram of a system for managing user devices, according to an exemplary embodiment.

FIG. 3A is a schematic diagram of a system for managing user devices, according to an exemplary embodiment.

Referring to FIG. 3A, the system includes the first terminal 110, the second terminal 120, and the domain server 130 as illustrated and disclosed with respect to FIG. 1.

The first terminal 110 may include, but is not limited to, a television (TV) or a personal computer (PC). The second terminal 120 may include, but is not limited to, a mobile communication device such as a smart phone having a camera function. The domain server 130 may exist inside or outside a home network.

Figure 3B:
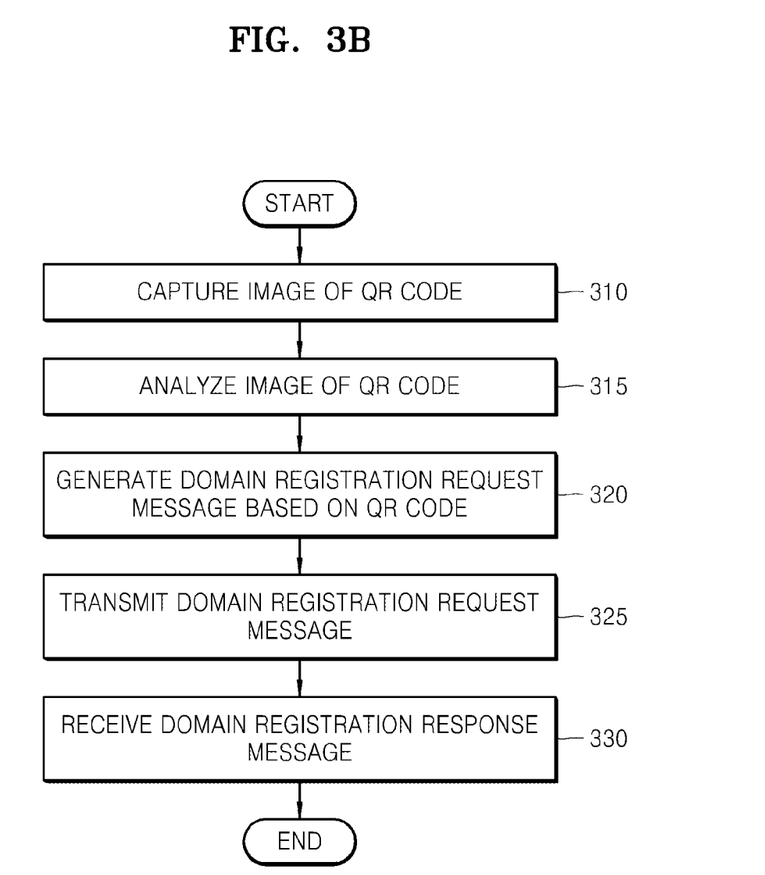
FIG. 3B is a flowchart of a method of managing user devices in view of the second terminal illustrated in FIG. 1, according to an exemplary embodiment.

FIG. 3B is a flowchart of a method of managing user devices in view of the second terminal 120 illustrated in FIG. 1, according to an exemplary embodiment.

Initially, the first terminal 110 displays on a screen at least one user-registered device 302 and a QR code 304 including domain information and information required to be registered to a domain. The first terminal 110 is a user terminal registered to the domain, and the user-registered devices 302 are user terminals registered to a common domain.

The second terminal 120 captures an image of the QR code 304 output (e.g., displayed on the screen) by the first terminal 110 (operation 310).

The second terminal 120 analyzes the captured image of the QR code and extracts the domain information (operation 315).

The second terminal 120 generates a domain registration request message based on the QR code 304 (operation 320).

The second terminal 120 transmits the domain registration request message to the domain server 130 (operation 325).

The second terminal 120 receives a domain registration response message from the domain server 130 (operation 330).

The second terminal 120 is thus informed that a domain registration process is completed, based on the domain registration response message.

Accordingly, according to an exemplary embodiment, a user terminal may be automatically registered to a domain.

Figure 4A:
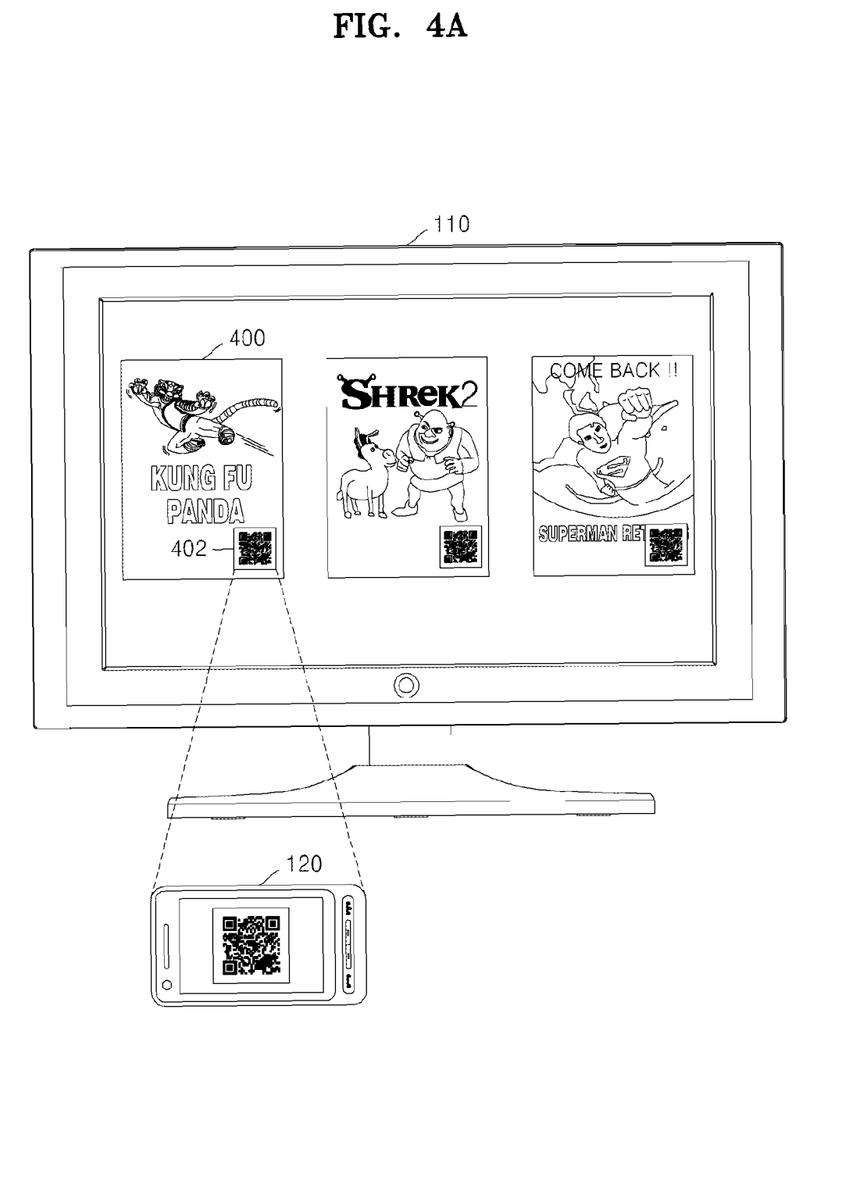
FIG. 4A is a schematic diagram of a system for managing contents by using quick response (QR) codes, according to an exemplary embodiment.

FIG. 4A is a schematic diagram of a system for managing contents by using QR codes, according to an exemplary embodiment.

The first terminal 110 is a user terminal such as a TV, and the second terminal 120 is a user terminal such as a mobile communication device, e.g., smart phone.

Figure 4B:
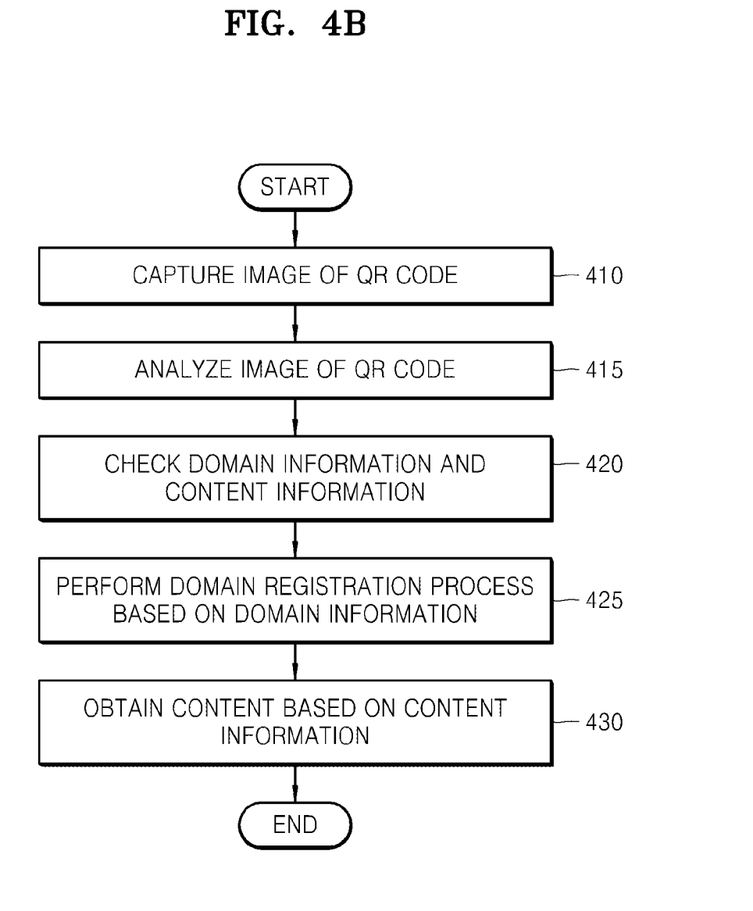
FIG. 4B is a flowchart of a method of managing contents in view of the second terminal illustrated in FIG. 1, according to an exemplary embodiment.

FIG. 4B is a flowchart of a method of managing contents in view of the second terminal 120 illustrated in FIG. 1, according to an exemplary embodiment.

Initially, the first terminal 110 displays on a screen a content 400 including a QR code 402. In this case, the QR code 402 includes at least one of content information, content server information, domain information, DRM information, and user information (e.g., an ID or a password (PWD)).

The QR code 402 displayed on the first terminal 110 may be received from the content server 150 or may be generated by the first terminal 110 with respect to the received content.

The second terminal 120 captures an image of the QR code 402 displayed on the first terminal 110 (operation 410).

The second terminal 120 analyzes the captured image of the QR code 402 (operation 415) and checks the domain information and the content information (operation 420).

The second terminal 120 performs a domain registration process together with the domain server 130 based on the checked domain information (operation 425), and obtains the content 400 from the first terminal or the content server 150 based on the content information (operation 430).

The first terminal 110 and the second terminal 120 may thus share the content 400 by using the QR code 402.

Accordingly, according to an exemplary embodiment, a search process and a domain registration process to share contents between user devices may be simplified by using QR codes.

Figure 5:
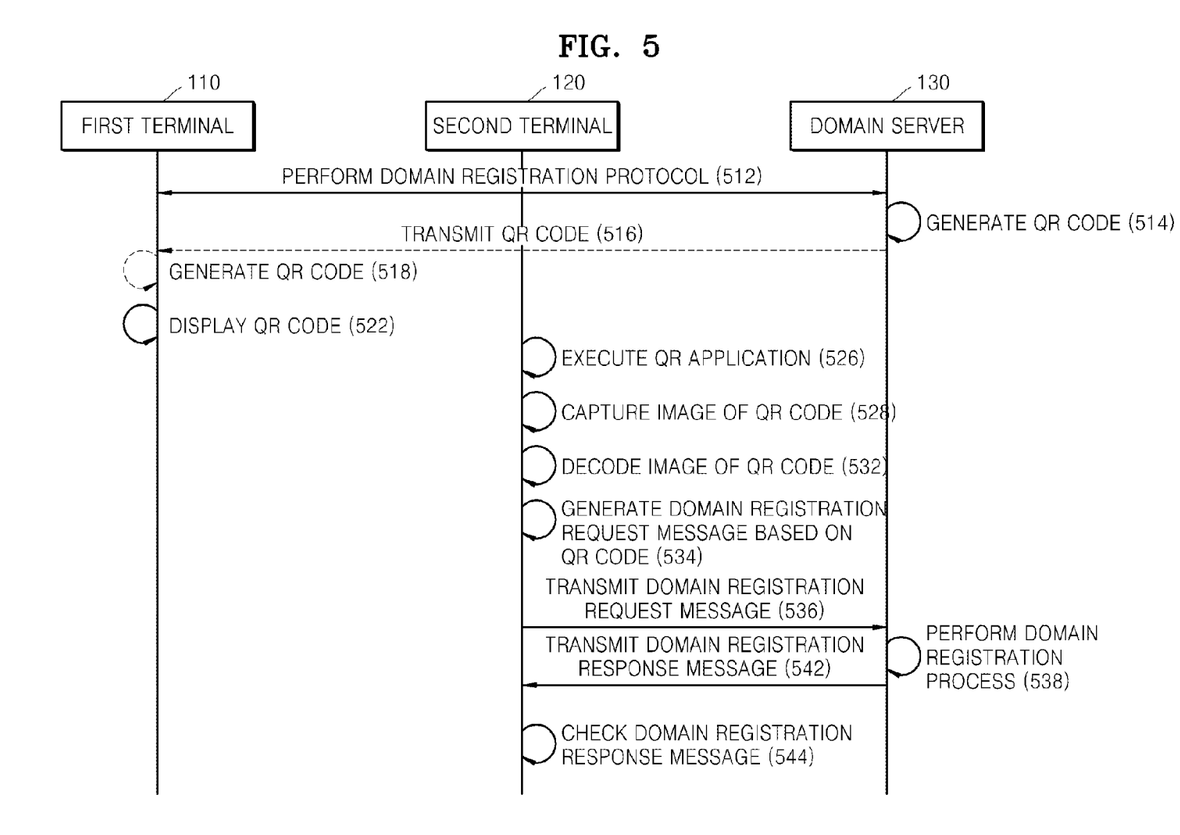
FIG. 5 is a detailed flowchart of a method of managing user devices by using QR codes, according to an exemplary embodiment.

FIG. 5 is a detailed flowchart of a method of managing user devices by using QR codes, according to an exemplary embodiment.

The first terminal 110 performs a domain registration protocol with the domain server 130 (operation 512). Accordingly, the domain server 130 registers the first terminal 110 as its device. For example, the first terminal 110, as a user device, transmits a domain registration request to the domain server 130, and the domain server 130 transmits a domain registration response to the first terminal 110 to confirm that the first terminal 110 is registered as its device.

Upon domain registration, the domain server 130 generates a QR code including domain information and information required to be registered to a domain (operation 514) and transmits the QR code to the first terminal 110 (operation 516).

The first terminal 110 generates a QR code including domain information and information required to be registered to a domain (operation 518).

The first terminal 110 may receive the QR code from the domain server 130 in the domain registration process, or may self-generate the QR code. The QR code includes at least one of server information, a user ID, DRM information, log-in information, and server verification information. The server information may include, but is not limited to, information regarding the domain server 130 or the content server 150. The server verification information may be a value for identifying server-provided information, or a medium access control (MAC) value or a signature value.

The first terminal 110 displays the QR code by executing an application related to the QR code or accessing a web site (operation 522).

Alternatively, if the application related to the QR code requires an authentication (e.g., log-in) process, the first terminal 110 may display the QR code after performing the log-in process.

The second terminal 120 executes a QR application to use the QR code (operation 526).

The second terminal 120 captures an image of the QR code. For example, the image of the OR code may be displayed on the first terminal 110 (operation 528).

The second terminal 120 decodes the captured image of the QR code and extracts the domain information and the information required to be registered to a domain (operation 532).

The second terminal 120 generates a domain registration request message based on the QR code (operation 534).

The second terminal 120 transmits the domain registration request message to the domain server 130 (operation 536).

If the domain registration request message is received from the second terminal 120, the domain server 130 performs a domain registration process (operation 538), and transmits a domain registration response message to the second terminal 120 (operation 542).

The second terminal 120 checks the domain registration response message and terminates the domain registration process (operation 544).

According to an exemplary embodiment, a user terminal may perform a domain registration process by using a QR code instead of a related domain registration process.

Figure 6:
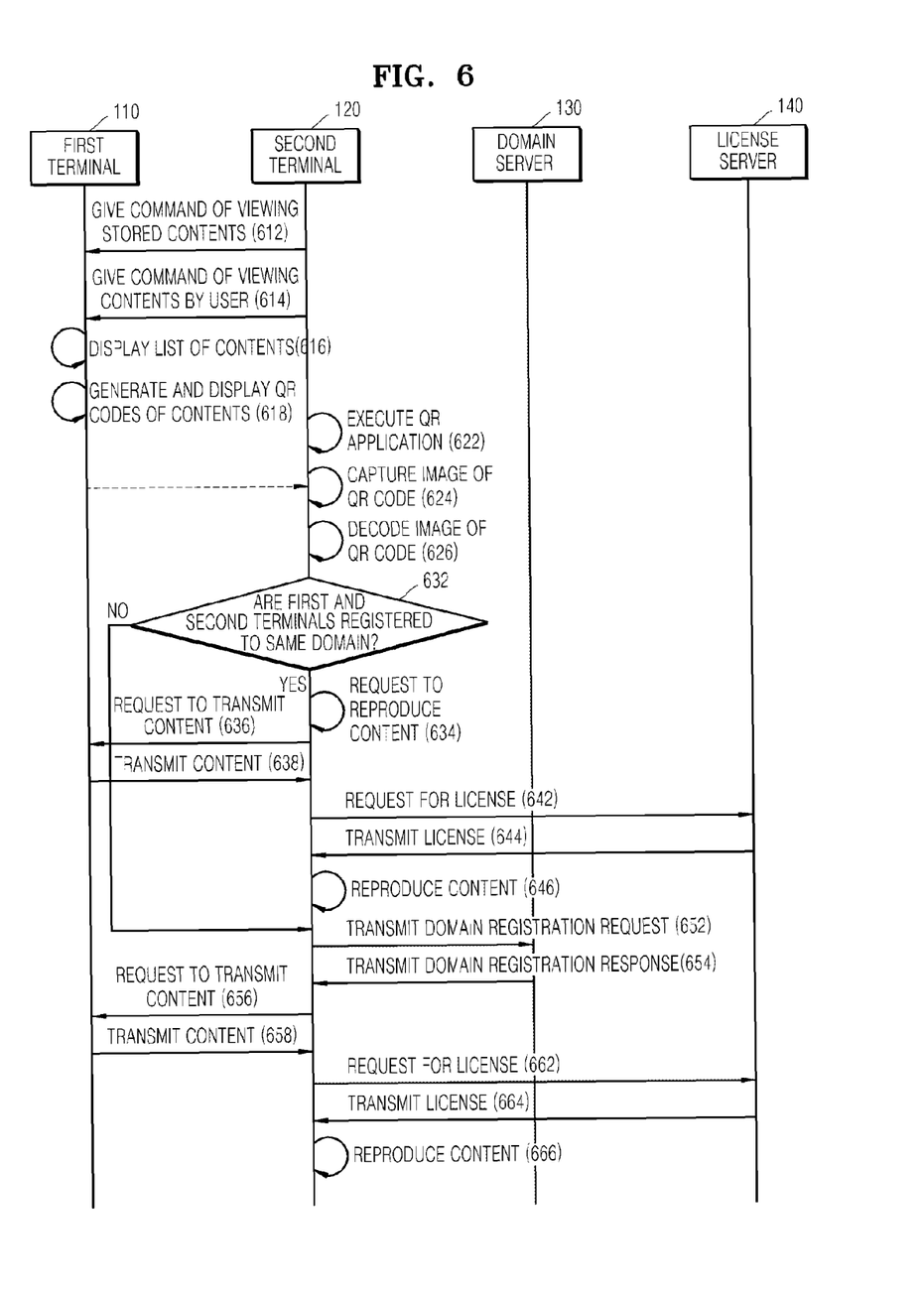
FIG. 6 is a detailed flowchart of a method of managing contents stored in user devices, according to an exemplary embodiment.

FIG. 6 is a detailed flowchart of a method of managing contents stored in user devices, according to an exemplary embodiment.

The second terminal 120 generates a command of viewing contents stored in the first terminal 110 (operation 612). Alternatively, a user may provide a command for viewing content stored in the first terminal 110, for example, by using a remote controller (operation 614).

If the command of viewing contents is received from the second terminal 120, the first terminal 110 displays (i.e., outputs) a list of contents, for example, on a screen (operation 616).

The first terminal 110 generates QR codes of contents and displays the generated QR codes on the screen (operation 618).

The QR code includes at least one of content information, content server information, domain information, DRM information, and user information (e.g., an ID or a PWD).

The second terminal 120 executes a QR application to use the QR code (operation 622).

The second terminal 120 captures an image of the QR code displayed on the first terminal 110 (operation 624).

The second terminal 120 decodes the captured image of the QR code and extracts the domain information and the content information (operation 626).

The second terminal 120 checks whether the first terminal and the second terminal 120 are registered to a common domain, by using the domain information extracted from the QR code (operation 632). That is, the second terminal 120 checks whether the second terminal 120 is registered to the domain based on the domain information included in the QR code.

If the second terminal 120 is registered to a common domain with respect to the first terminal 110, content reproduction is requested (operation 634).

The second terminal 120 requests the first terminal 110 to transmit the content (operation 636).

The first terminal 110 transmits the content to the second terminal 120 (operation 638).

If the received content is protected by using a DRM method, the second terminal 120 requests the license server 140 for a license of the content (operation 642).

The license server 140 transmits the license of the content to the second terminal 120 as a response (operation 644).

If the license of the content is received from the license server 140, the second terminal 120 reproduces the content (operation 646).

If the second terminal 120 is not registered to the same domain as the first terminal 110, the second terminal 120 transmits a domain registration request to the domain server 130 (operation 652).

If a domain registration response is received from the domain server 130 (operation 654), the second terminal 120 requests the first terminal 110 to transmit a content (operation 656).

The first terminal 110 transmits the content to the second terminal 120 (operation 658).

If the content is received from the first terminal 110, the second terminal 120 requests the license server 140 for a license of the content (operation 662).

The license server 140 transmits the license of the content to the second terminal 120 as a response (operation 664).

If the license of the content is received from the license server 140, the second terminal 120 reproduces the content (operation 666).

Figure 7:
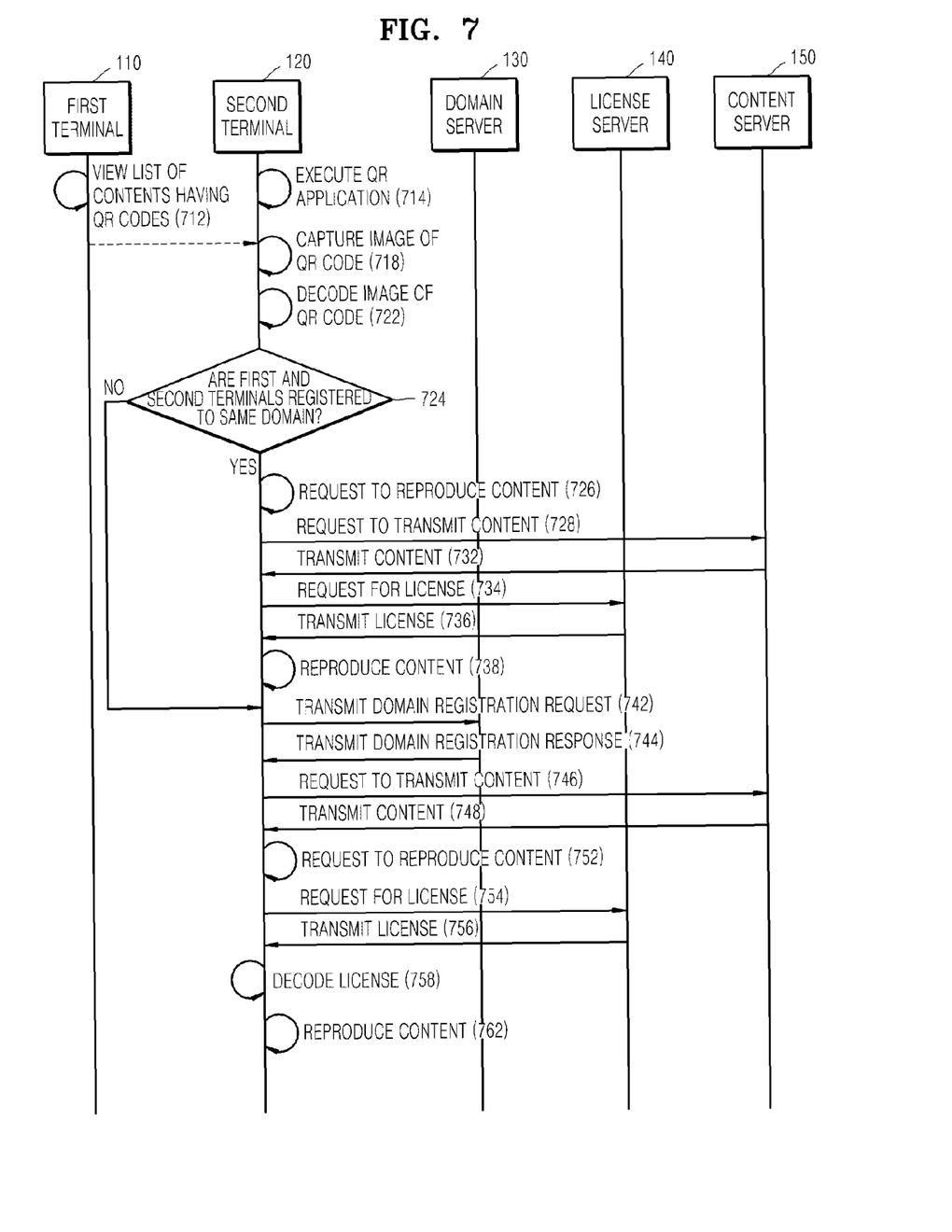
FIG. 7 is a detailed flowchart of a method of managing contents provided by a content server illustrated in FIG. 1, according to an exemplary embodiment.

FIG. 7 is a detailed flowchart of a method of managing contents provided by the content server 150 illustrated in FIG. 1, according to an exemplary embodiment.

The first terminal 110 accesses the content server 150 and browses content provided on a web page.

When the content is browsed, a list of content having QR codes is viewed (operation 712).

The QR codes may be generated (e.g., directly) by the first terminal 110 or may be provided by the content server 150. Also, the QR code includes at least one of content information, content server information, domain information, DRM information, and user information (e.g., an ID or a PWD).

The second terminal 120 executes a QR application to use the QR code (operation 714).

The second terminal 120 captures an image of the QR code displayed on the first terminal 110 (operation 718).

The second terminal 120 decodes the captured image of the QR code and extracts the domain information and the content information (operation 722).

The second terminal 120 checks whether the second terminal 120 is registered to a common domain with respect to the first terminal 110, by using the domain information extracted from the QR code (operation 724). That is, the second terminal 120 checks whether the second terminal 120 is registered to the domain based on the domain information included in the QR code.

If the second terminal 120 is registered to a common domain with respect to as the first terminal 110, content reproduction is requested (operation 726).

The second terminal 120 requests the content server 150 to transmit content (operation 728).

The content server 150 transmits the requested content to the second terminal 120 (operation 732).

If the received content is protected by using a DRM method, the second terminal 120 requests the license server 140 for a license of the content (operation 734).

The license server 140 transmits the license of the content to the second terminal 120 as a response (operation 736).

If the license of the content is received from the license server 140, the second terminal 120 reproduces the content (operation 738).

If the second terminal 120 is not registered to a common domain with respect to the first terminal 110, the second terminal 120 transmits a domain registration request to the domain server 130 (operation 742).

If a domain registration response is received from the domain server 130 (operation 744), the second terminal 120 requests the content server 150 to transmit a content (operation 746).

The content server 150 transmits the content to the second terminal 120 (operation 748).

If content reproduction is requested (operation 752), the second terminal 120 requests the license server 140 for a license of the content (operation 754).

The license server 140 transmits the license of the content to the second terminal 120 as a response (operation 756).

If the license of the content is received from the license server 140, the second terminal 120 decodes the license (operation 758) and reproduces the content (operation 762).

According to an exemplary embodiment, contents may be shared between user devices by using QR codes.

Exemplary embodiments may include a program implementable in a general-purpose computer including a processor that executes instructions of the program using a computer readable recording medium. Examples of the computer readable recording medium include but are not limited to magnetic storage media (e.g., ROM, floppy disks, hard disks, etc.), optical recording media (e.g., CD-ROMs, or DVDs).

While the inventive concept has been particularly shown and described with reference to exemplary embodiments thereof, it will be understood by one of ordinary skill in the art that various changes in form and details may be made therein without departing from the spirit and scope of the inventive concept as defined by the following claims. The exemplary embodiments should be considered in a descriptive sense only and not for purposes of limitation. Therefore, the scope of the inventive concept is defined not by the detailed description of the invention but by the following claims, and all differences within the scope will be construed as being included in the present inventive concept.

What is claimed is:

1. A method of managing user devices, the method comprising:
capturing an image of a quick response (QR) code attached to audiovisual content displayed on a display, the QR code comprising a user identification (ID) and content information identifying the audiovisual content displayed on the display;
analyzing the captured image of the QR code, and generating a domain registration request message based on the QR code;
transmitting the domain registration request message to a domain server, and receiving a domain registration response message from the domain server;
obtaining the audiovisual content based on the content information; and
reproducing the audiovisual content, wherein the domain registration response message received from the domain server comprises information indicating that the user devices are registered to a domain.

2. The method of claim 1, wherein one of the user devices comprises a user terminal is registered to a domain.

3. The method of claim 1, wherein the QR code is received from the domain server or is generated by a user terminal that displays the image of the QR code.

4. The method of claim 1, wherein the QR code comprises domain information and information required to be registered to a domain.

5. The method of claim 1, wherein the QR code comprises at least one of domain server information, digital rights management (DRM) information, log-in information, and server verification information.

6. The method of claim 1, wherein, when an application related to the QR code requires authentication, a user terminal displays the image of the QR code after performing the authentication.

7. A method of managing content, the method comprising:
capturing an image of a quick response (QR) code attached to audiovisual content displayed on a display, the QR code comprising a user identification (ID) and content information identifying the audiovisual content;
analyzing the captured image of the QR code and checking domain information and content information; and
performing a domain registration process with a domain server based on the domain information, and obtaining the audiovisual content from at least one of a user terminal and a content server based on the content information; and
reproducing the audiovisual content,
wherein a domain registration message comprising information indicating that user devices are registered to a domain, is received from the domain server.

8. The method of claim 7, wherein the QR code is at least one of received from the content server and generated by the user terminal.

9. The method of claim 7, further comprising:
displaying a list of the audiovisual content on the user terminal.

10. The method of claim 7, wherein the QR code comprises at least one of domain information and information required to be registered to a domain.

11. The method of claim 7, wherein the QR code comprises at least one of domain information, content server information, digital rights management (DRM) information, and user information.

12. The method of claim 7, wherein registration of another user terminal to a domain is determined based on the domain information in the QR code.

13. The method of claim 7, further comprising:
requesting at least one of the user terminal and the content server to transmit the audiovisual content if another user terminal is registered to a common domain with the user terminal; and
transmitting a domain registration request to the domain server if the other user terminal is not registered to the common domain with the user terminal.

14. The method of claim 7, further comprising obtaining a license of the obtained content from the content server if the audiovisual content is protected by using a digital rights management (DRM) method.

15. An apparatus for managing user devices and content, the apparatus comprising:

a quick response (QR) application unit that executes an application related to a QR code;
an image capturing unit that captures an image indicative of the QR code attached to audiovisual content, the QR code, the QR code comprising a user identification (ID) and content information identifying the audiovisual content;
a QR code decoder that decodes the image of the QR code, which is captured by the image capturing unit, and extracts domain information and the content information;
a data transception unit that transmits a domain registration request message to a domain server based on the domain information extracted by the QR code decoder, and receives a domain registration message and the audiovisual content from the domain server based on the content information; and
a controller that reproduces the audiovisual content.

16. The apparatus of claim 15, wherein a user terminal in communication with the apparatus outputs the image of the QR code, the user terminal comprising:
a QR code generation unit that generates a QR code based on the domain information and the content information; and
a display unit that displays the image indicative of the QR code generated by the QR code generation unit.

17. The apparatus of claim 15, wherein the QR code comprises at least one of domain information, and information required to be registered to a domain.

18. A non-transitory computer readable recording medium having recorded thereon executable instructions in a program for executing:
capturing an image of a quick response (QR) code attached to audiovisual content displayed on a display, the QR code comprising a user identification and content information identifying the audiovisual content displayed on the display;
analyzing the captured image of the QR code and checking domain information and content information;
performing a domain registration process with a domain server based on the domain information, and obtaining the audiovisual content from at least one of a user terminal and a content server based on the content information; and
reproducing the audiovisual content,
wherein a domain registration message comprising information indicating that user devices are registered to a domain, is received from the domain server.

19. A network system for managing user devices and contents, comprising:
at least one domain device comprising a first terminal and a second terminal; and
a management server comprising at least one of a domain server, a license server, and a content server,
wherein the first terminal generates an output indicative of a quick response (QR) code attached to audiovisual content, and the second terminal receives the output and executes an operation based on the output to perform domain registration and obtain audiovisual content based on content information contained in the QR code,
wherein a domain registration message comprising information indicating that user devices are registered to a domain, is received from the domain server, and wherein the QR code comprises a user identification and the content information identifying the audiovisual content which is reproduced by the second user terminal.

20. The system of claim 19, wherein the first terminal is a user display terminal, and the second terminal is a mobile communication device configured to receive the image.

21. The system of claim 19, wherein the QR code comprises at least one of domain server information, content server information, digital rights management (DRM) information, log-in information, and server verification information.

22. The system of claim 19, wherein the second terminal performs a domain registration process with the domain server using the QR code generated by the first terminal, and the second terminal shares content of the first terminal with the management server based on the QR code attached to the audiovisual content.

23. The system of claim 19, wherein the operation at the second user terminal based on the QR code comprises:
   executing a QR code application;
   capturing and decoding the output indicative of the generated QR code;
   generating a domain registration request based on the captured decoded QR code; and checking domain registration.

24. A user terminal for managing user devices and audiovisual content, comprising
   a domain registration unit that performs domain registration with a domain server;
   an output unit that generates an output indicative of a quick response (QR) code attached to audiovisual content displayed on a display,
   wherein execution of operations is performed in response to receipt of the output indicative of the QR code, the operations comprising:
      executing a QR code application; and
      capturing and decoding the output indicative of the QR code,
   wherein a domain registration message comprising information indicating that at least one user device is registered to a domain, is received from the domain server, and
   wherein the QR code comprises a user identification (ID) and content information identifying the audiovisual content which is reproduced by the user terminal.

25. The user terminal of claim 24, wherein the execution of the operations further comprises:
   generating a domain registration request based on the decoded QR code; and
   checking domain registration.

26. The user terminal of claim 24, wherein the execution of the operations further comprises the user terminal obtaining the audiovisual content in response to a transmission request when a common registration condition exists, based on the captured decoded QR code.

27. The user terminal of claim 24, wherein the execution further comprises receiving the audiovisual content based on the output indicative of the QR code, and reproducing the audiovisual content based on a license condition.

\* \* \* \* \*